(12) United States Patent
Davis, Jr.

(10) Patent No.: US 7,788,000 B1
(45) Date of Patent: Aug. 31, 2010

(54) PUBLIC HIGHWAY SYSTEM

(76) Inventor: William D. Davis, Jr., 25805 Hampshire La., Rolling Hills Estate, CA (US) 90274

( * ) Notice: Subject to any disclaimer, the term of this patent is extended or adjusted under 35 U.S.C. 154(b) by 0 days.

(21) Appl. No.: 12/656,517

(22) Filed: Feb. 2, 2010

Related U.S. Application Data (60) Provisional application No. 61/202,295, filed on Feb. 17, 2009.

(51) Int. Cl.
*G08C 1/09* (2006.01)
(52) U.S. Cl. .......................... 701/20; 701/119; 104/243
(58) Field of Classification Search ................... 701/20, 701/23, 24, 36, 117, 96, 300, 301, 119; 104/124, 104/242, 243, 134
See application file for complete search history.

(56) References Cited

U.S. PATENT DOCUMENTS

| | | |
|---|---|---|
| 3,875,856 A | 4/1975 | Meeker |
| 5,845,583 A | 12/1998 | Jensen |
| 6,082,268 A | 7/2000 | Lund |
| 6,129,026 A | 10/2000 | LeCroy |
| 6,314,890 B1 | 11/2001 | Geldbaugh |
| 6,742,458 B2 | 6/2004 | Henderson |
| 6,900,740 B2 * | 5/2005 | Bloomquist et al. ......... 340/905 |
| 6,934,603 B1 | 8/2005 | Kochanneck |
| 2006/0201376 A1 | 9/2006 | Brigham et al. |
| 2007/0107621 A1 | 5/2007 | Zou |

FOREIGN PATENT DOCUMENTS

WO WO2007059524 (A2) 5/2007

* cited by examiner

*Primary Examiner*—Richard M. Camby
(74) *Attorney, Agent, or Firm*—Richard C. Litman (57) ABSTRACT

The public highway system includes automated, elevated single lane throughways having wide and narrow gauge rail track arranged in various combinations. A control system regulates spacing of bimodal vehicles while maintaining a uniform speed for all vehicles on the system. The bimodal vehicles perform as conventional automobiles on conventional roadways and as fully automated safe high speed vehicles on elevated single lane, single speed, high-density electric rail guideways using static vertical switching accomplished by operation of variable gauge rail wheels on the vehicle to engage with or disengage from a wide gauge track portion wider than the bimodal vehicles. Vehicles enter/leave the mainline on the narrower gauge track. The wider gauge is for passing over off-ramps or in switching systems. A single lane can handle 15,800 veh/hr including mixed use such as mail, freight, mass transit in captive driverless vehicles with exclusive off-ramps to federal, commercial, industrial and public terminals.

20 Claims, 12 Drawing Sheets

PUBLIC HIGHWAY SYSTEM

CROSS-REFERENCE TO RELATED APPLICATION

This application claims the benefit of U.S. Provisional Patent Application Ser. No. 61/202,295, filed Feb. 17, 2009.

BACKGROUND OF THE INVENTION

1. Field of the Invention

The present invention relates to vehicle traffic systems, and particularly to a public highway system that uses dual use vehicles and vertical switching guideways.

2. Description of the Related Art

There is a need for a unique design for an alternative mode of transportation to supplement our automobile freeway systems, which have become grossly overcrowded in the urban and suburban environment. Until now there has never been a concept that demonstrates that a practical, viable, economical, bimodal guideway/vehicle system can be developed with current state-of-the-art knowledge to supplement our 100 year old crumbling highway system. It would be desirable to have dual use vehicles that are a new form of automobile that integrates an additional but separate operating subsystem. There is a need for a system that, in addition to its conventional street operating mode, utilizes a dual use vehicle that can operate on elevated (grade separated) single lane dedicated guideways. The guideway mode of operation should be fully automated, electric, safe, non-polluting, offering vehicle speeds of 120 mph. With this country's addiction to oil, the world wide demand for oil, the anticipated shortage of oil and the pollution created by burning fossil fuels, we are long overdue for a new system of transportation which can supplement our current system with a much safer, electric portal-to-portal system.

Thus, a public highway system solving the aforementioned problems is desired.

SUMMARY OF THE INVENTION

The public highway system includes an automated, elevated single lane throughway comprised of wide and narrow gauge rail track arranged in various combinations. A control system within each vehicle regulates spacing of dual use vehicles while maintaining a uniform speed for all vehicles on the system. The rail switching is vertical and is accomplished by operation of variable gauge rail wheels on the vehicle to engage with or avoid engaging with a wide gauge track portion of the rail guide. On-ramps are taken by the vehicle temporarily engaging with a rising wide gauge section of track that begins in parallel with the narrow gauge track to separate tested vehicles from the abort track. Off-ramps are taken by the vehicle avoiding engagement with a wide gauge section of throughway track initially in parallel with the narrow gauge track, the narrow gauge track descending to remove the vehicle from the throughway. Staying on the throughway involves engagement of the variable gauge wheels with the wide gauge track.

There will be multiple entrance and exit gated areas at each mainline, i.e., throughway switch permitting smooth access or egress to and from these dual mode systems. Alternatively, a system using magnetic levitation or aerodynamic levitation in lieu of wheels is contemplated.

There also will be special parking structures designed to handle large numbers of these vehicles automatically by assigning each vehicle to a space using a modified guideway to deliver, store and retrieve said vehicle.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
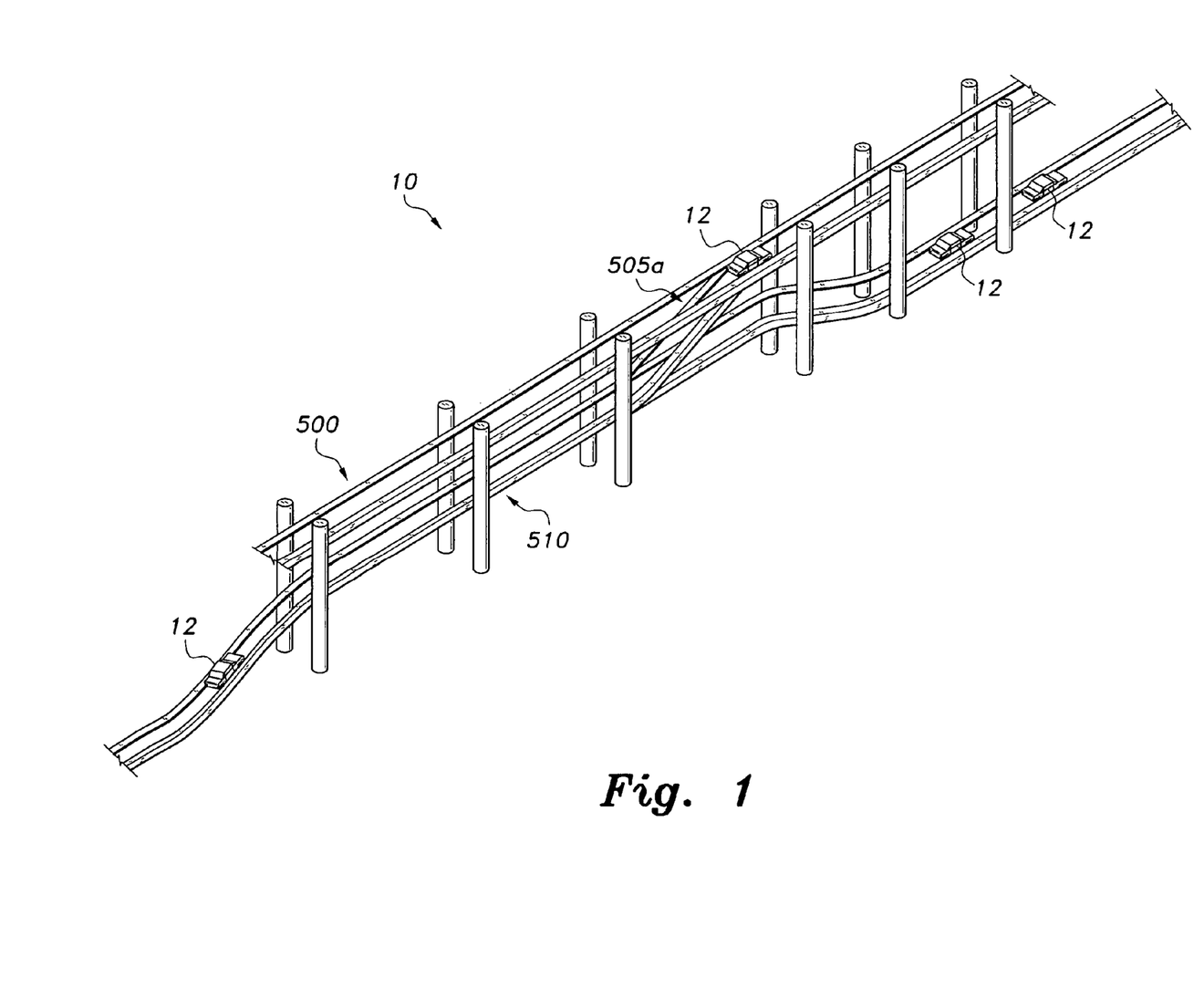
FIG. 1 is an environmental, perspective view of a public highway system according to the present invention.
Figure 2:
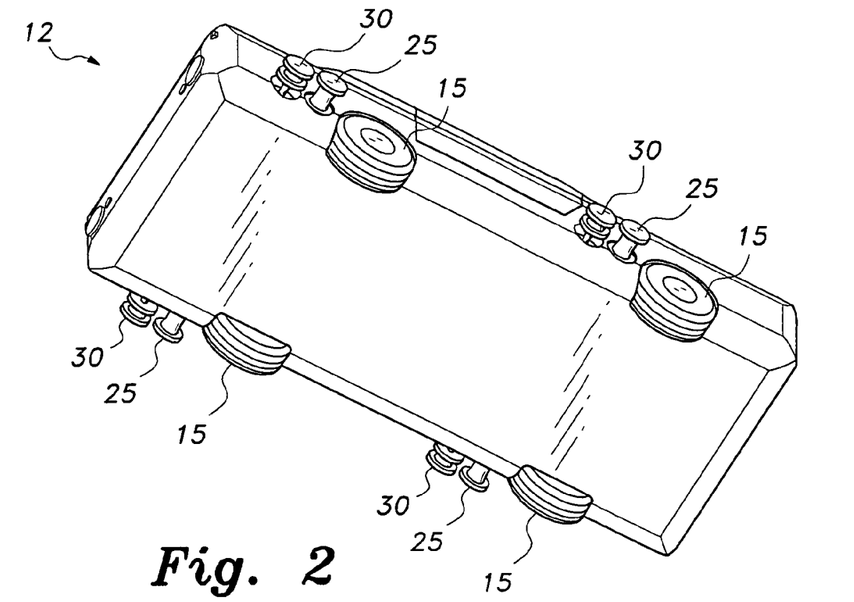
FIG. 2 is a bottom perspective view of a vehicle with retractable variable gauge rail wheels in a narrow gauge configuration according to the present invention.
Figure 3:
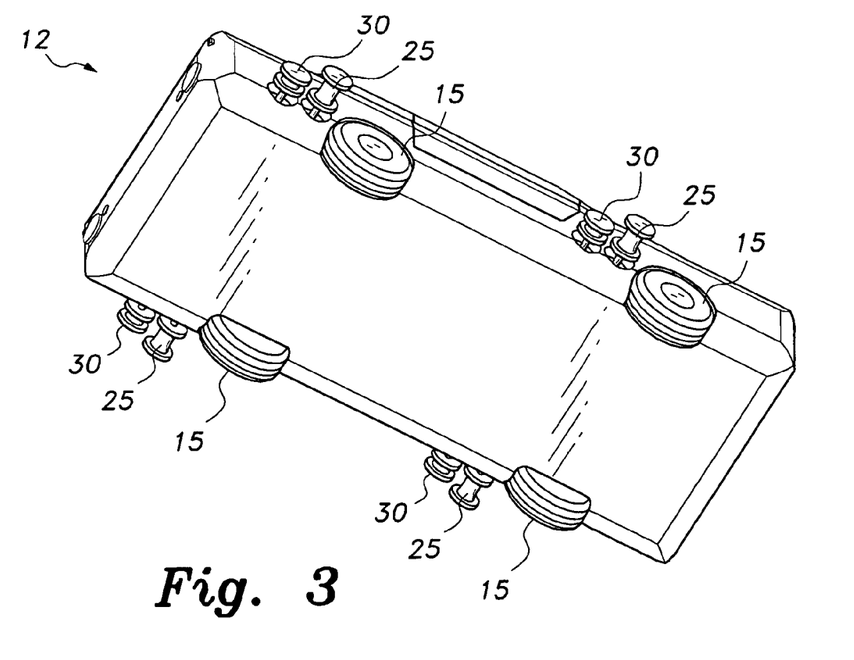
FIG. 3 is a bottom perspective view of a vehicle with retractable variable gauge rail wheels in a wide gauge configuration according to the present invention.
Figure 5:
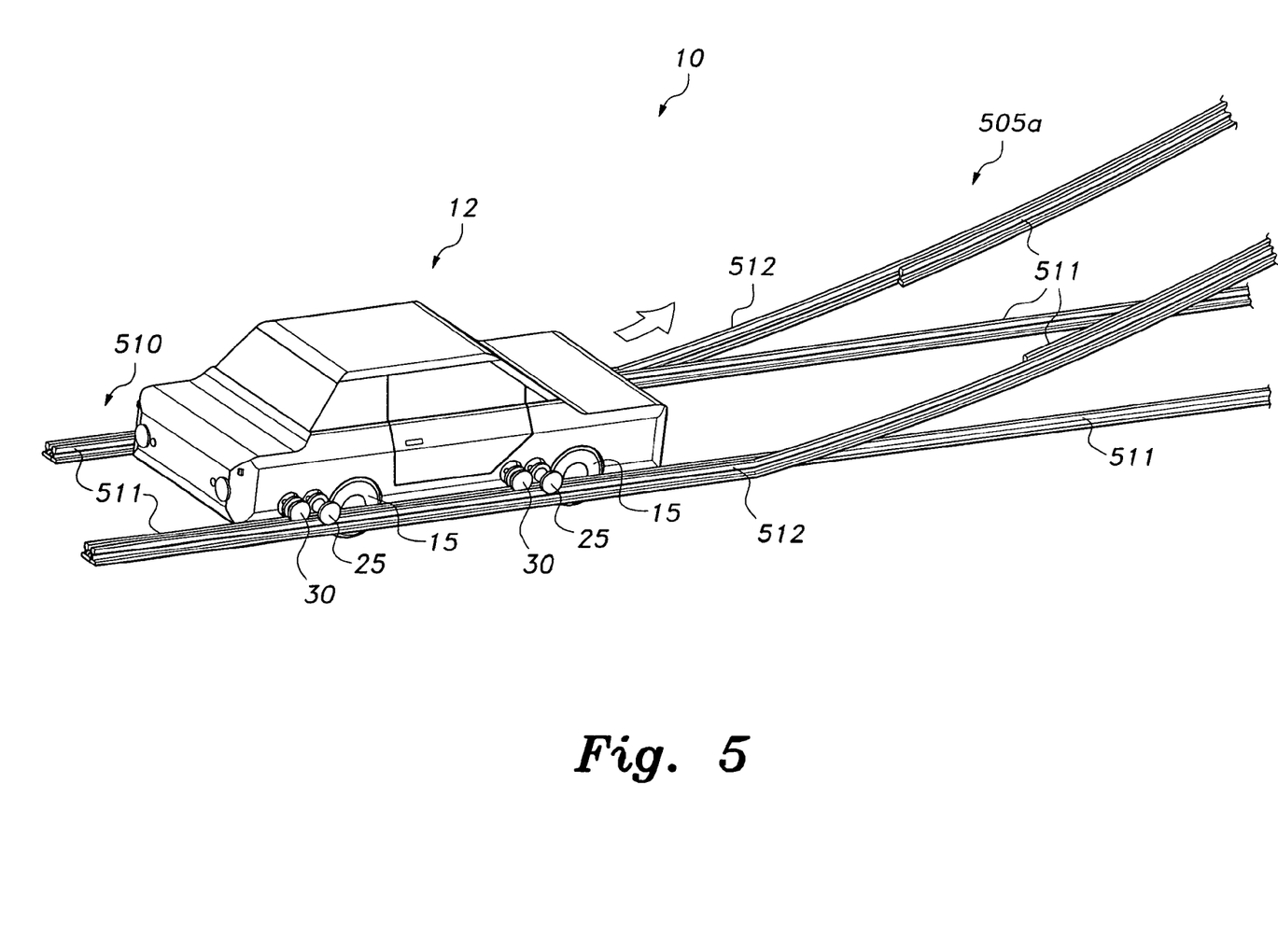
FIG. 5 is a perspective view of the vehicle selectively engaging an on-ramp section of the public highway system according to the present invention.
Figure 10:
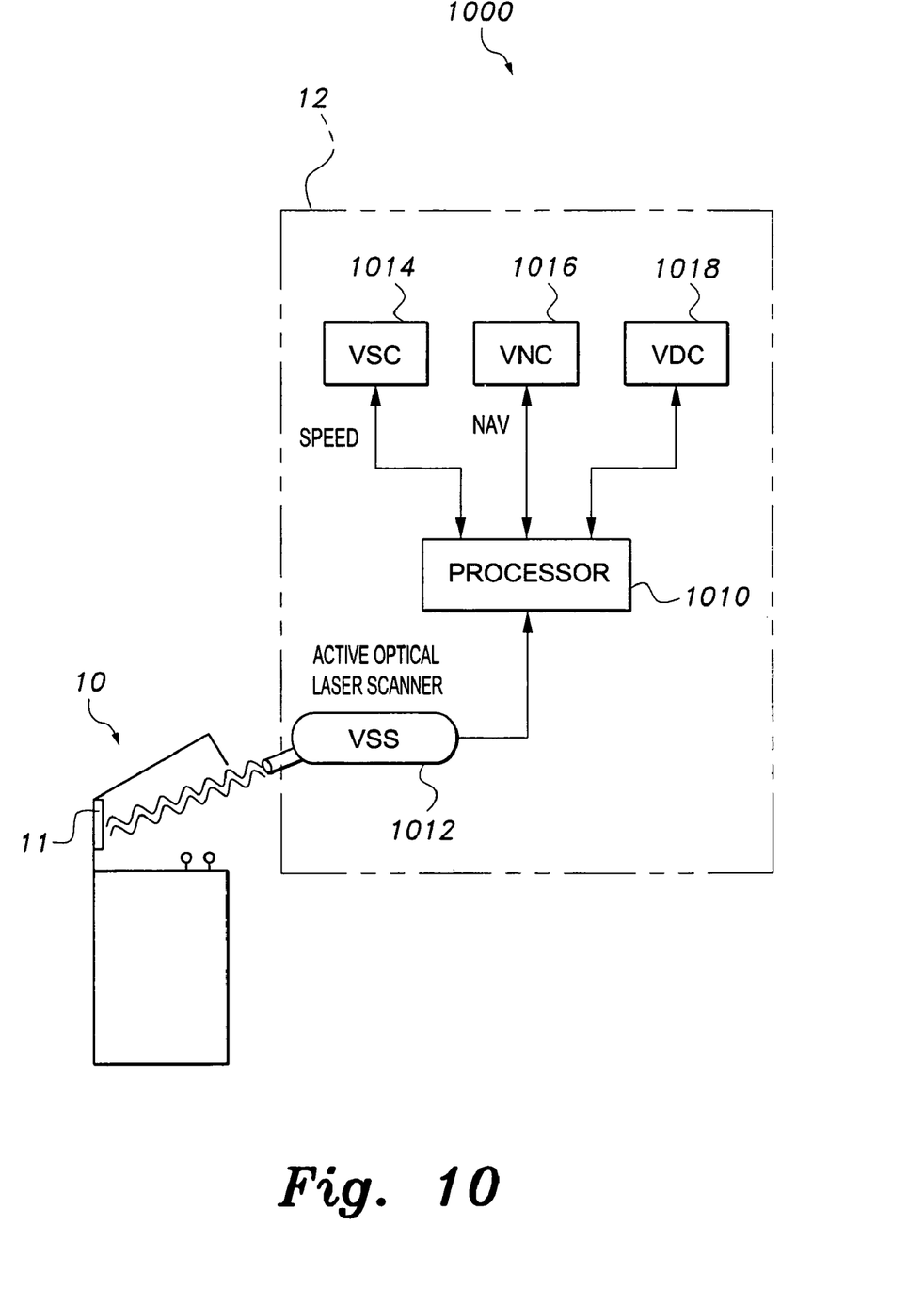
FIG. 10 is a block diagram of a control system of the public highway system according to the present invention.

As shown in FIGS. 1, 5, 6A, 6B, and 7, the public highway system includes an automated, elevated single lane throughway comprised of wide and narrow gauge rail track arranged in various combinations. As shown in FIG. 10, a control system regulates spacing of dual use vehicles 12 while maintaining a uniform speed for all vehicles on the system. As shown in FIGS. 2, 3, and 5, vertical rail switching is accomplished by operation of variable gauge rail wheels 25 on the vehicle 12 to engage with or avoid engaging with a wide gauge track portion 512 of the rail guide. On-ramps 505a are taken by the vehicle 12 temporarily engaging with a rising wide gauge section of track 512 that begins in parallel with the narrow gauge track 511 at entrance area 510. Off-ramps 505b are taken by the vehicle avoiding engagement with a wide gauge section 512 of throughway track initially in parallel with the narrow gauge track 511, the narrow gauge track 511 descending through open space between rails of the wide gauge track 512 to remove the vehicle 12 from the throughway. Staying on the throughway involves engagement of the variable gauge wheels 25 with the wide gauge track 512. As shown in FIGS. 2, 3, and 8, dual use vehicle 12 is an automobile specially designed and manufactured to meet rigid specifications and safety tests to allow it to operate on a grade separated, preferably electric high speed automated guideway having narrow gauge rails 511 and wide gauge rails 512. Features of a conventional automobile are maintained in that the vehicle still has conventional wheels 15 for street and highway use.

For use in automated highway system 10, the vehicle 12 has the ability to extend a front and rear pair of variable gauge flanged rail engagement wheels 25. Additionally a front and rear pair of fixed gauge (narrow gauge) flanged rail engagement wheels 30 are extended for operation with guideway system 10. Left and right portions of hydraulic actuation system H independently control the variable gauge rail wheels 25 and the fixed gauge rail wheels 30. All eight of these wheels are driven by electric motor system M, either individually, in pairs or by one common motor. All eight wheels can be totally withdrawn into the vehicle 12 or extended horizontally out of the vehicle 12. When operating in the street mode the wheels 25 and 30 are in the withdrawn position.

When operating on the guideway system 10 the narrow gauge wheels 30 are fixedly extended to engage narrow gauge track 511 wherever narrow gauge track 511 is positioned in the system 10. The variable gauge rail wheels 25 are extended to either a narrow gauge position or a wide gauge position that engage either narrow gauge track 511 or wide gauge track 512 depending on navigation control commands from a vehicle navigation computer 1016.

Figure 6A:
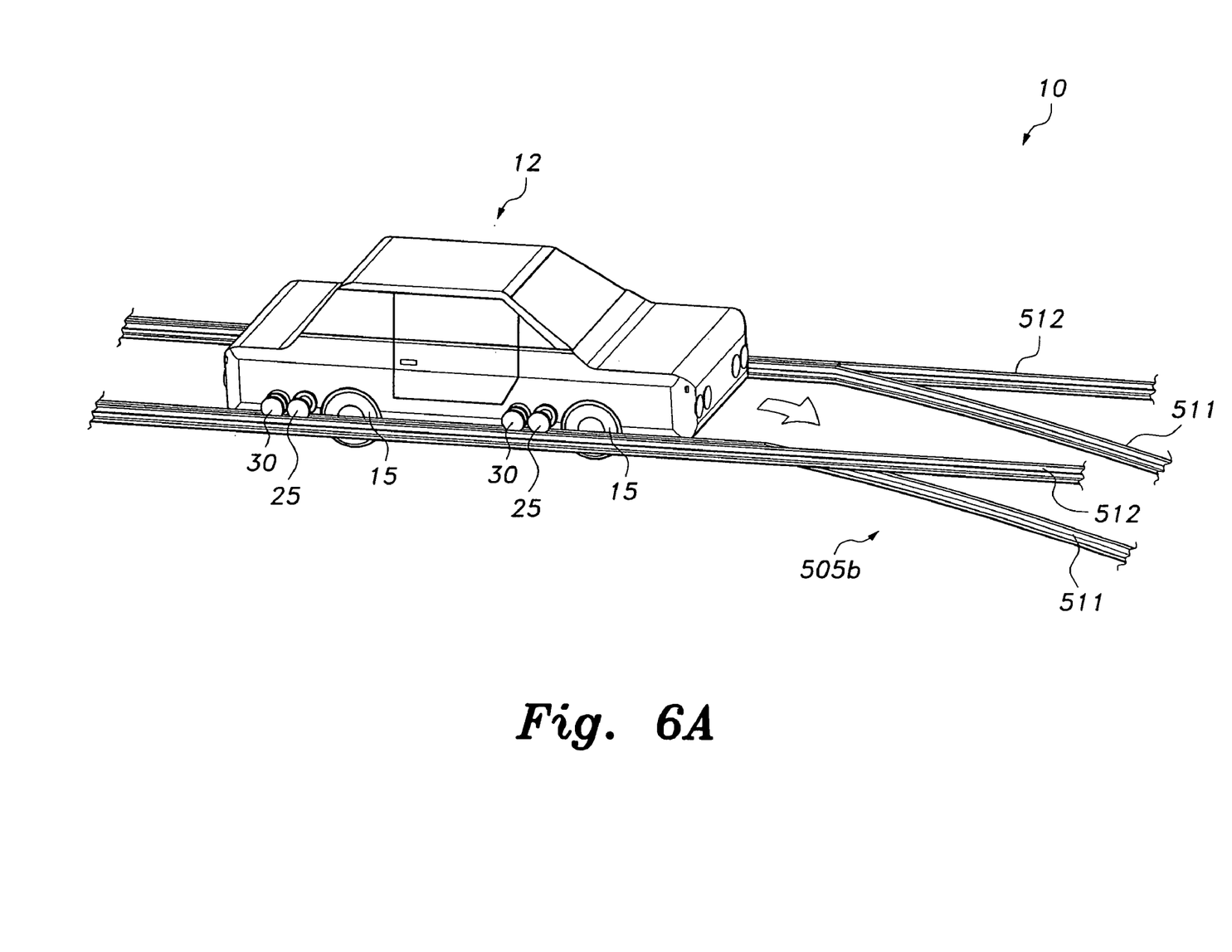
FIG. 6A is a perspective view of the vehicle selectively engaging an off-ramp section of the public highway system according to the present invention.
Figure 6B:
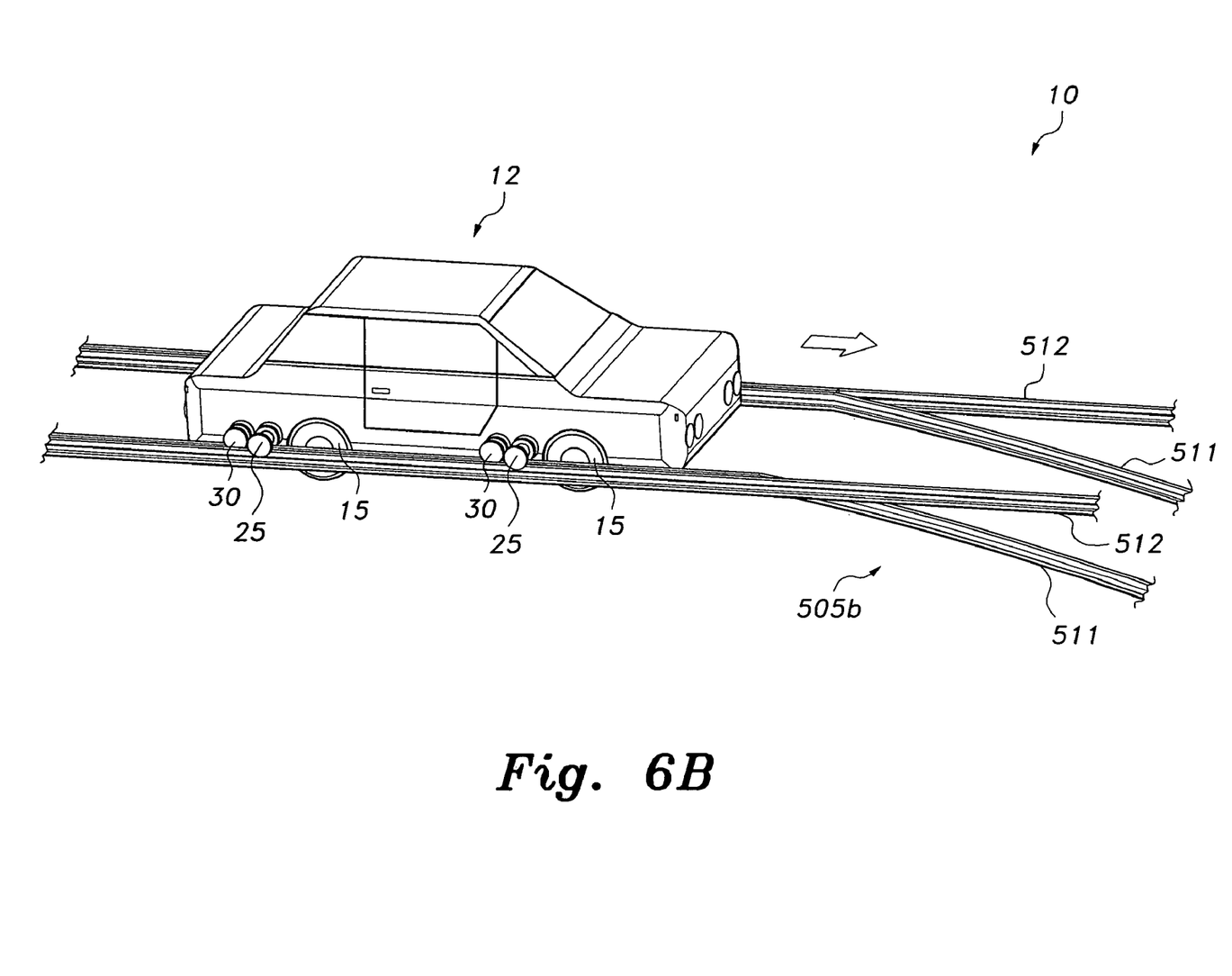
FIG. 6B is a perspective view of the vehicle selectively engaging a through section of the public highway system according to the present invention.
Figure 7:
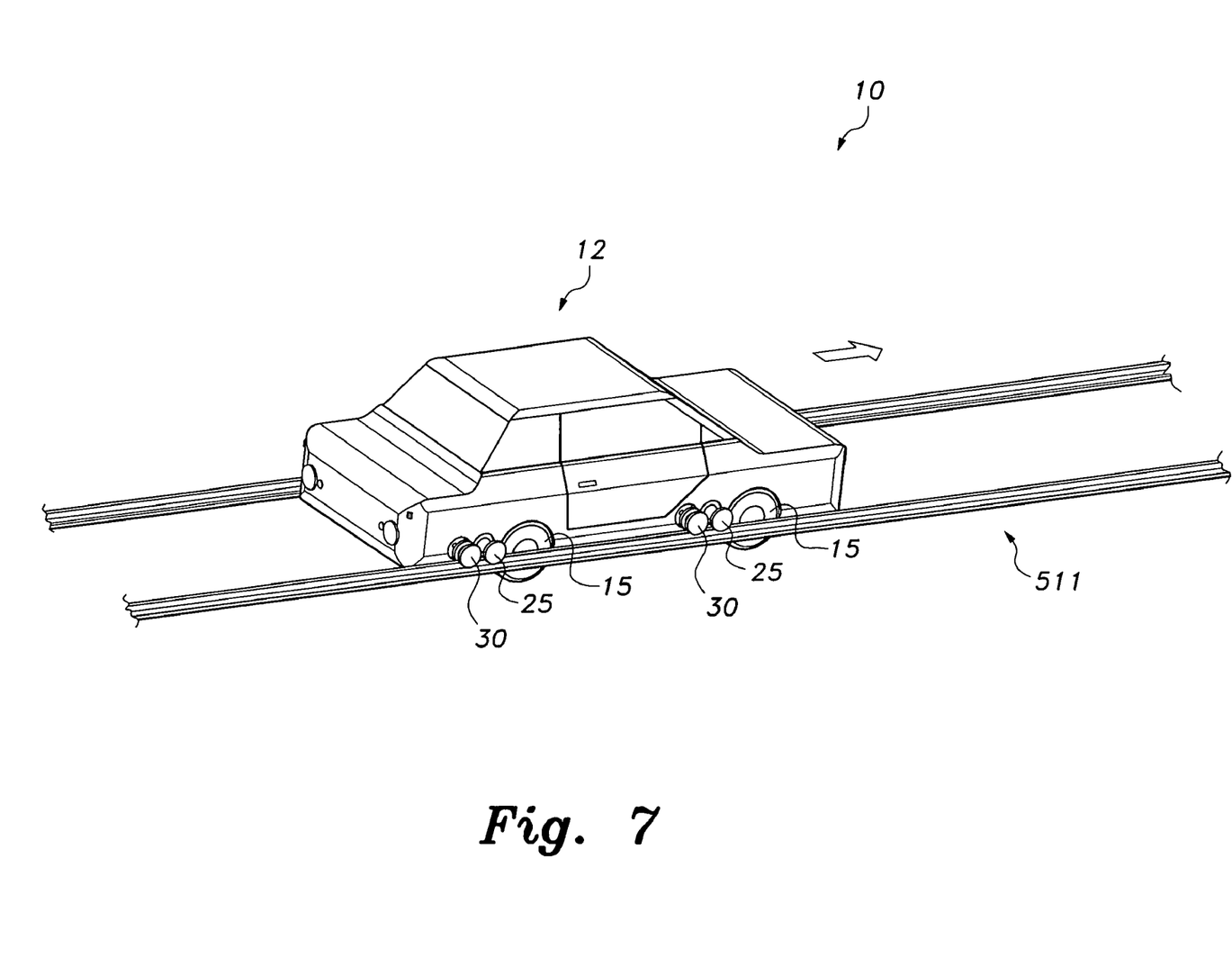
FIG. 7 is a perspective view of the vehicle traveling along a throughway portion of the public highway system according to the present invention.
Figure 8:
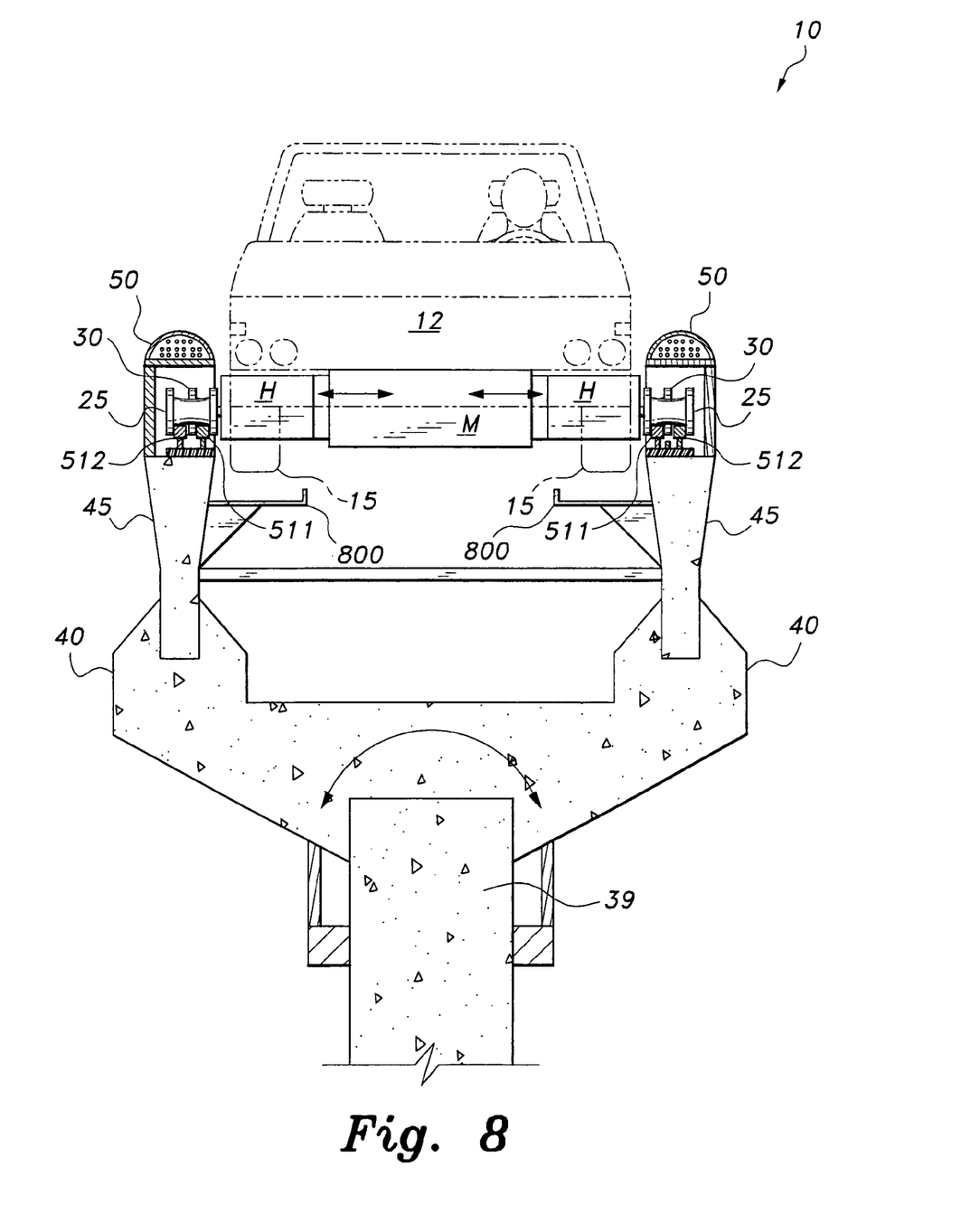
FIG. 8 is a partial section view of the track in relation to the vehicle wheel assembly according to the present invention.

As shown in FIG. 7, throughway areas of the guideway utilize only the narrow gauge track 511. As shown in FIG. 6a, the narrow gauge track 511 is also used to take an off-ramp 505b. The wide gauge track 512 is used for over-passing off ramps 505b, as shown in FIG. 6b, and for entering the system 10, as shown in FIG. 5. The vehicle 12 rides between two rails mounted on top of concrete beams on either side of the vehicle 12. When the steel wheels 25, and/or 30 contact the steel rails, electric power is picked up from the guideway and the vehicle 12 begins to move on the guideway 10 under electric power. At the first few feet of every on-ramp area 510, the system 10 performs an automated inspection of the bi-modal, i.e., dual use vehicle 12 to verify the vehicle's ability to meet predetermined automated guideway system operating criteria. The vehicle 12 is permitted to proceed to a holding area to await an assignment to a position in the traffic pattern if the vehicle 12 meets the predetermined automated guideway system operating criteria.

After receiving a guideway signal that an open position is available, the system 10 assigns a position on the guideway for the vehicle and then causes the vehicle 12 to accelerate at a precise rate to assume the position within traffic on the guideway. The system 10 causes all traffic on the guideway to flow at a constant speed. Each guideway in the overall system 10 may be set by the system 10 to flow traffic at a system specified speed for that particular guideway, i.e., 60 mph for urban with frequent on/off ramps, 90 mph for suburban with less frequent ramps, and 120 mph for interurban with the fewest ramps. These are merely exemplary speed values since analysis will determine the optimum velocity for each individual guideway on a case-by-case basis. All on/off ramps are designed for vertical rather than horizontal switching. With the exception of the vehicle 12, there are preferably no moving parts in the guideway 10. FIG. 10 illustrates a possible control system 1000 utilized by automated public highway system 10. Responsive to commands from control system 1000, switching is performed by the vehicle 12 rather than by the track.

Passive coded bar graphs 11 for the bimodal system vehicles may be disposed at regular intervals within the guideway 10, e.g., on a portion of the vertical guideway supports 45, or on some other structure in proximity with the guideway 10. Electro-optical laser scanners (Sensors 1012) in the vehicle receive data from the guideway bar graphs to determine speed and location of vehicle 12 so that the system 10 can place vehicle 12 in an unassigned position. Sensing devices 1012 may employ technologies such as laser, radar, GPS and/or interaction with the guideway to provide precise vehicle location and velocity at all times. The sensors 1012 report vehicle speed and acceleration so that control portion of the system, e.g., processor 1010 can determine whether to permit the vehicle 12 to continue on the guideway of system 10. If the test performed by the system 10 detects an anomaly in any of the vehicle's bimodal components, the system 10 causes the vehicle 12 to withdraw the variable gauge wheels 25 to the narrow gauge position in order to continue to an off ramp via narrow gauge rails 511 to abort entry into throughway portion of the highway system 10.

If the vehicle 12 passes the test it continues with its wheels 25 still in the wide gauge position. At this point a wide gauge track 512 initially adjacent and parallel to the narrow gauge 511 rises up to meet the thoroughfare via a transition zone where narrow gauge track 511 is again disposed between the wide gauge rails 512 and the vehicle 12 again rides the narrow gauge 511 and wide gauge 512 rails for a short distance until the wide gauge 512 terminates as the narrow gauge 511 in transition zone 505a (as shown in FIG. 1) continues upward to meet a thoroughfare portion of the rail guide system 10.

Riding only on the narrow gauge the vehicle 12 is commanded to withdraw the variable gauge wheels 25 to the narrow gauge position prior to continuing up the ramp and joining the main line at transition zone 505a. Thus the vehicle will proceed to join the main guideway of system 10 while riding on the narrow gauge 511. Vehicles ahead of and behind this vehicle that were already on the main guideway would be riding on the outer gauge as well as the inner gauge after it rejoined the main line of system 10. Once the inner gauge 511 and outer gauge 512 tracks are running at the same level and parallel to each other the outer gauge 512 fades away and all vehicles are riding on the inner gauge 511 in a throughway portion of system 10.

Figure 11:
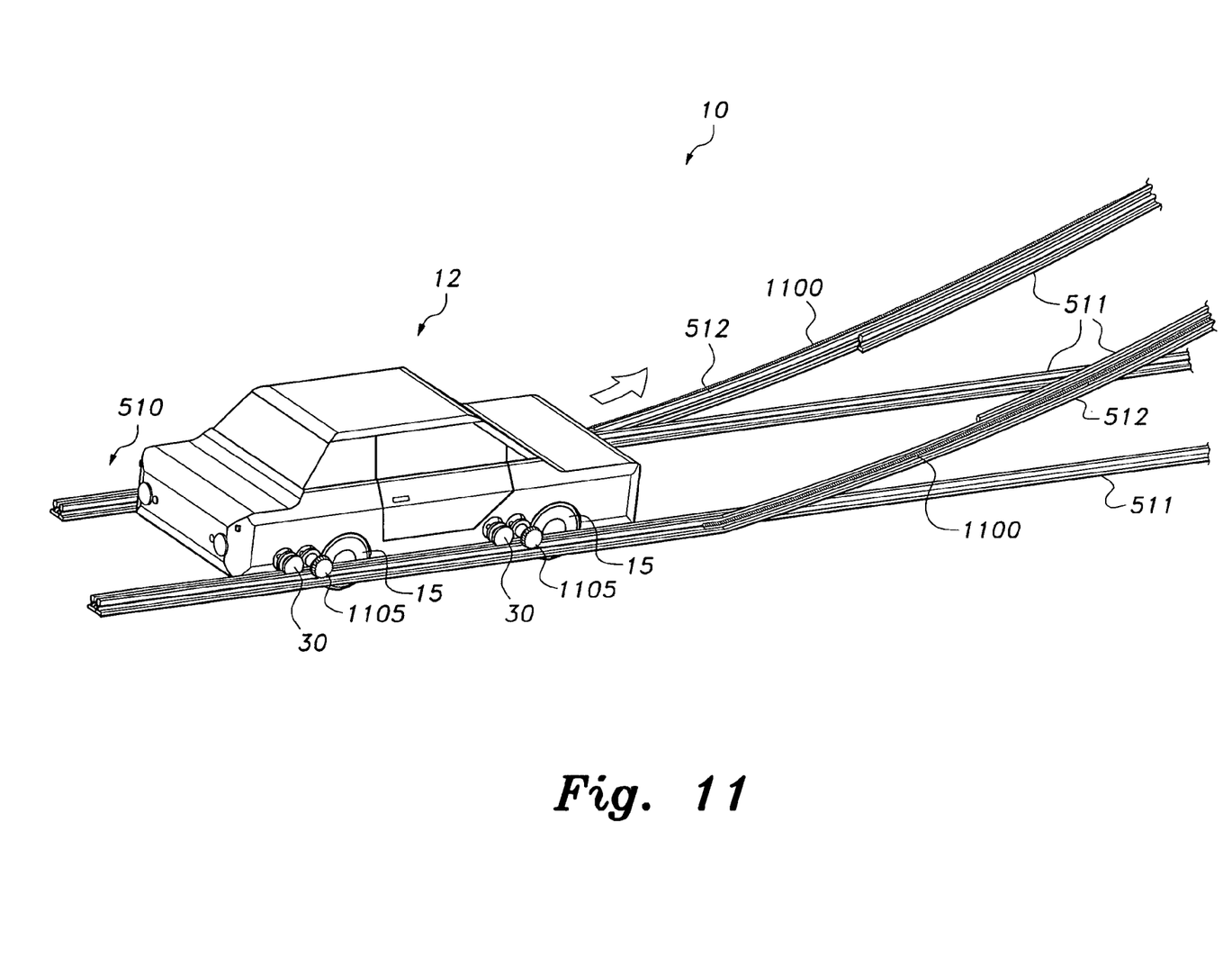
FIG. 11 is a perspective view of the vehicle selectively engaging a grade assist portion of the public highway system according to the present invention.

As shown in FIG. 6B, if the vehicle 12 is to remain on main thoroughfare of the guideway and not exit at the next off ramp the vehicle 12 must be directed to extend the variable gauge wheels 25 to the wide gauge position so that the wide gauge wheels 25 will pick up the outer gauge track 512 and travel across off-ramp 505b. With the variable gauge wheels 25 in the wide gauge position the vehicle 12 will remain on the main thoroughfare portion of the guideway of system 10 indefinitely. Moreover, as shown in FIG. 11 if there is a requirement for a high vertical gradient that might cause the vehicle to slip while trying to advance along the track system 10, outer rail 511 may have teeth 1100 instead of a smooth rail surface thereby allowing accessory wheel teeth 1105 on vehicle 12 to engage the wide track 511 for greater traction.

For each vehicle on the automated guideway 10, sensors 1012 of control system 1000 (shown in FIG. 10) communicate information about vehicle location to processor 1010. The processor 1010 is in operable communication with vehicle speed controller VSC 1014, vehicle navigation controller VNC 1016 and vehicle diagnostic controller VDC 1018 to permits high-speed vehicles to operate at close headways when exiting or entering the system.

Speed limitations on the highway system 10 may be determined by the coefficient of friction between the wheel systems 25 and 30 and the track systems 511 and 512 during, e.g., bad weather, the maximum grade of a specific guideway, and the power available in each of the vehicles 12. Under nominal conditions a preferred speed for vehicle 12 is approximately 120 mph. A preferred nominal grade is approximately 2%, and nominal headwinds are less than 60 mph.

By eliminating major intersections/clover-leafs between separate guideways the system 10 eliminates the potential for an entire system blockage. All transfers between guideways of system 10 are performed while the vehicle is on a roadway, i.e., a first guideway can be exited, while a second guideway can be entered which will take the driver closer to his/her destination. In case of emergency, all vehicles can be stopped simultaneously and then directed to the next off-ramp at slow speed.

The vertical switching of automated guideway system 10 uses considerably less land space since the space directly under the elevated portion of the guideway can be used for switching and other purposes.

The vertical switch is designed to effectively handle continuous high speed loading or off-loading a guideway by incrementally splitting ramps such as ramps 505a and 505b. Each pair of ramps would increase or decrease vehicle velocity by 50%. Thus a high traffic area on-ramp could have as many as 8 starting on-ramps operating at 15 mph combining the 8 into 4 ramps increasing vehicle velocity to 30 mph, these combining into 2 ramps at 60 mph and combining this traffic into one on-ramp at 120 mph.

Design of guideway system 10 provides the ability to add on and off-ramps to an existing guideway with minimum down time, thereby offering additional flexibility to a guideway planning commission.

The vertical switching of guideway system 10 makes it possible to design a single lane guideway which can handle more traffic than a four lane highway, with great savings in lives, land use, reduced pollution, and less construction costs. The average four-lane highway handles approximately 10,000 vehicles per hour at 60 mph. A single lane bimodal guideway of system 10 is designed to handle over 15,000 vehicles per hour at 120 mph.

The system provides enhanced safety through automated control system 1000, which can also be redundant with redundant versions of processor 1010, redundant controllers 1014, 1016, and 1018, as well as redundant sensors 1012. Due to the automated control system 1000, upon receipt of a signal from the guideway that an empty position is available, the vehicle 12 will proceed to accelerate at a specified rate until it reaches the design speed. The information transfer from guideway to vehicle sensors determines that the space allocated and speed of the vehicle 12 are compatible and the vehicle continues to enter the flow of traffic. Each vehicle maintains a preferably 40-foot electrical/mechanical space when it enters the system 10. All spaces or positions are maintained by the vehicle interfacing with the track and front and rear distance sensors.

Each vehicle maintains its position at the center of the 40-foot space through redundant locating systems. The entire guideway system relies heavily on: redundant subsystems, high reliability critical parts, and thorough testing at all phases of development as well as at every on-ramp. Safety and reliability are the main reasons for determining that the guideway mode should be a separate subsystem from the rest of the automobile. This mode needs to be protected by the automobile such that it cannot be damaged except in the most destructive types of street/highway accidents. The subsystems, such as controllers 1012, 1014, 1016, and 1018, are fully enclosed in the body of vehicle 12 and may also be enclosed in a heavy metal jacket. Safety and reliability are the two most important features of the fully automated high-speed transportation system 10 described herein.

Once on the guideway, full automation of the system 10 safely relieves the driver from a requirement of attentiveness. The operator sets the NAV controller 1016 to exit at the desired off-ramp. Prior to arriving at the designated off-ramp an alarm will notify the occupants to prepare to exit. The operator must prepare to take control of the automobile 12 in the street mode. At a predetermined location on the narrow gauge track 511 the vehicle 12 will place the variable gauge wheels 25 in the narrow gauge mode. This will permit the vehicle to ride only on the narrow gauge and exit the system while those vehicles having wheels 25 in the wide gauge mode will continue on the main line having connected with the wide gauge track before reaching the exit ramp 505b.

Figure 9A:
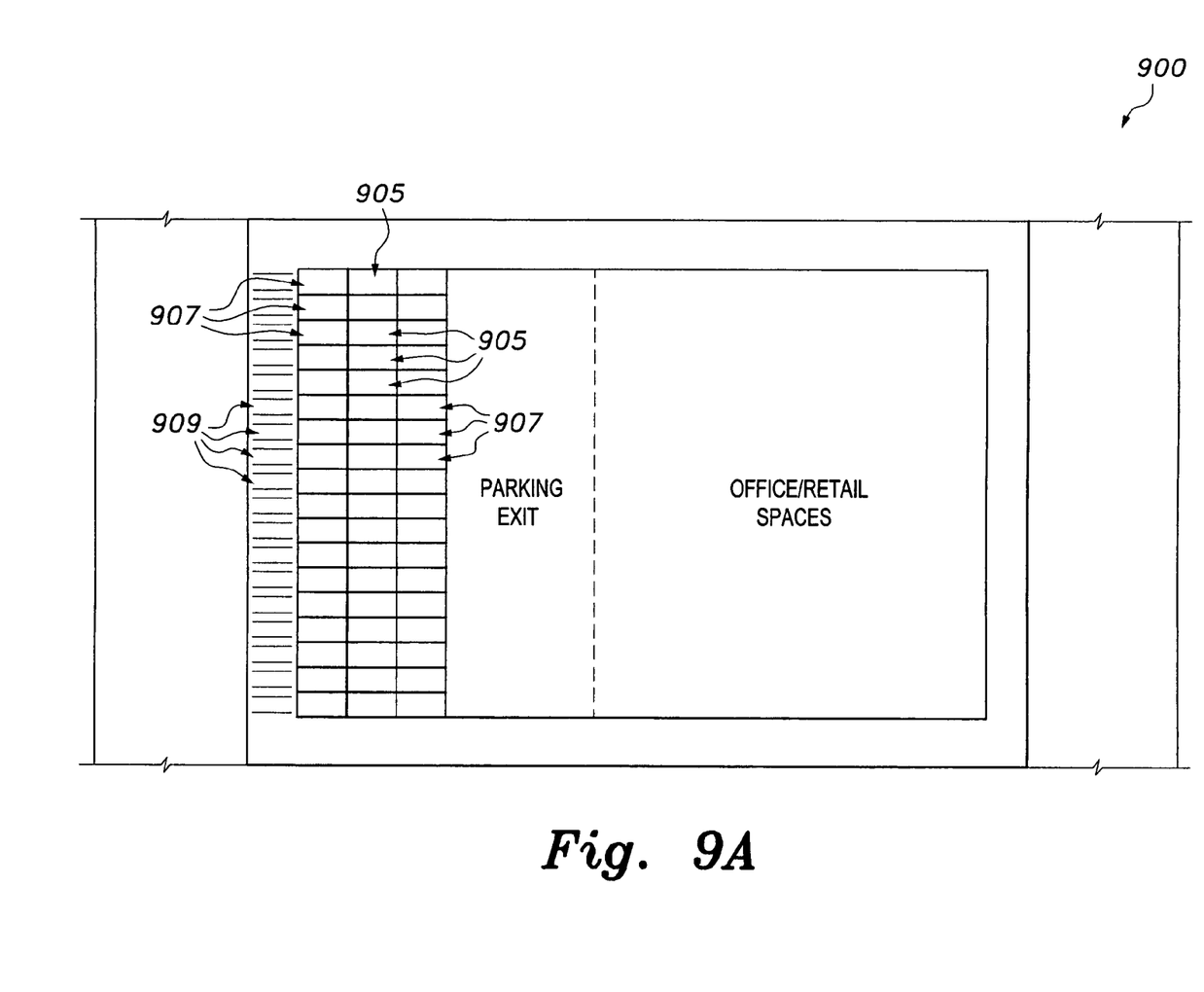
FIG. 9A is a plan view of a parking structure for vehicles of the public highway system according to the present invention.
Figure 9B:
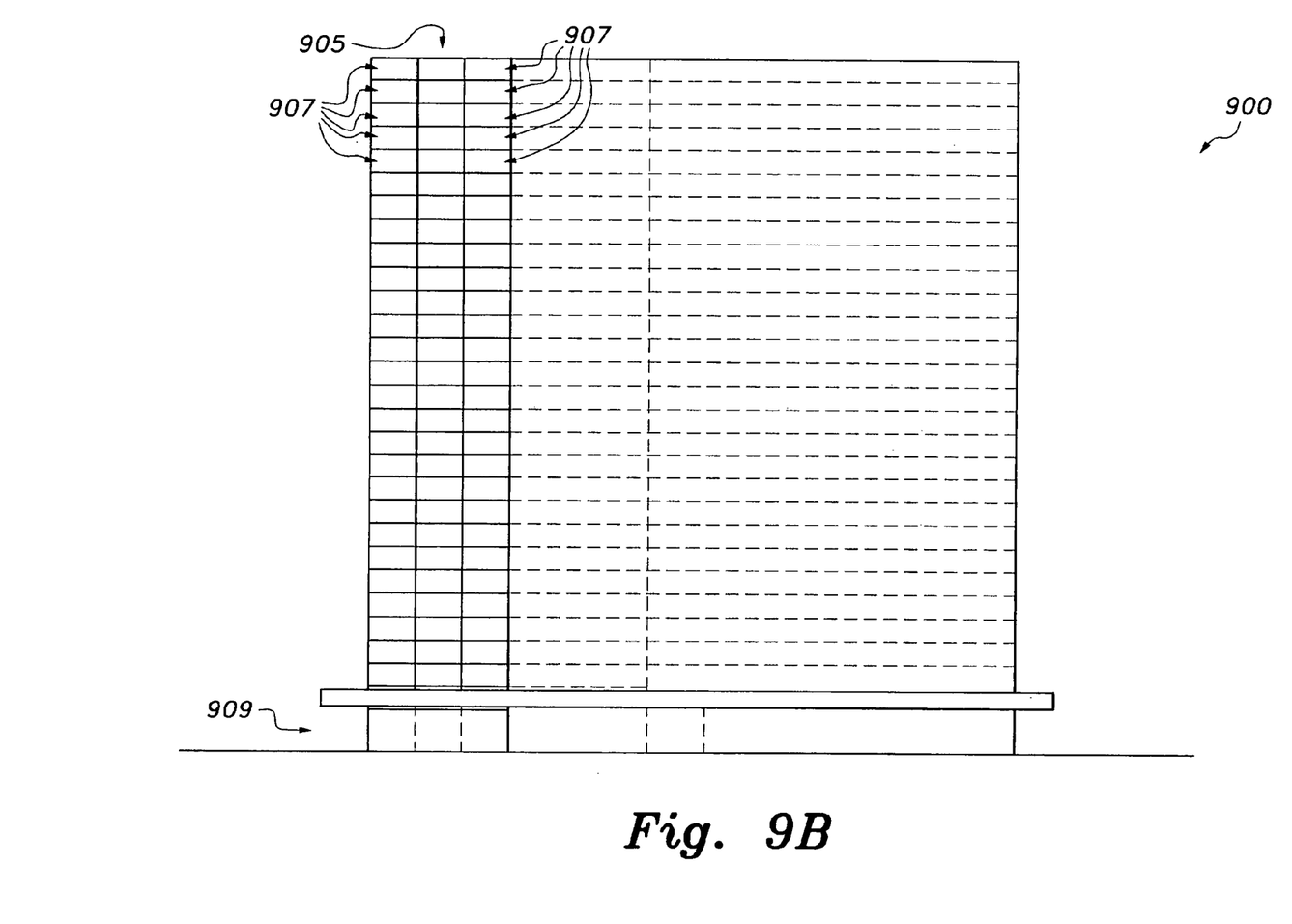
FIG. 9B is a side view of a parking structure for vehicles of the public highway system according to the present invention.

Down the off-ramp the exiting vehicle may transfer to other off-ramps, reducing speed all the time, from 120 mph, to 60 mph, to 30 mph, and finally to 15 mph and down a gently sloping ramp to the street where the driver takes over. The driver may then guide vehicle 12 into a parking facility 900 (shown in FIGS. 9A-9B) that is specially designed to store parked cars in columns using their rail wheels. The parking structure is rectangular and has a plurality of elevator shafts 905 disposed between a plurality of rail guided passageways 907. A vehicle 12 may be manually and/or automatically guided into one of the spaces 907 for storage on its rail wheels. For each elevator-passageway combination there is an entrance path 909. The parking facility 900 advantageously utilizes the rail wheels of vehicles 12 to store the vehicles in a compact manner while maximizing office/retail area of the building.

Figure 4:
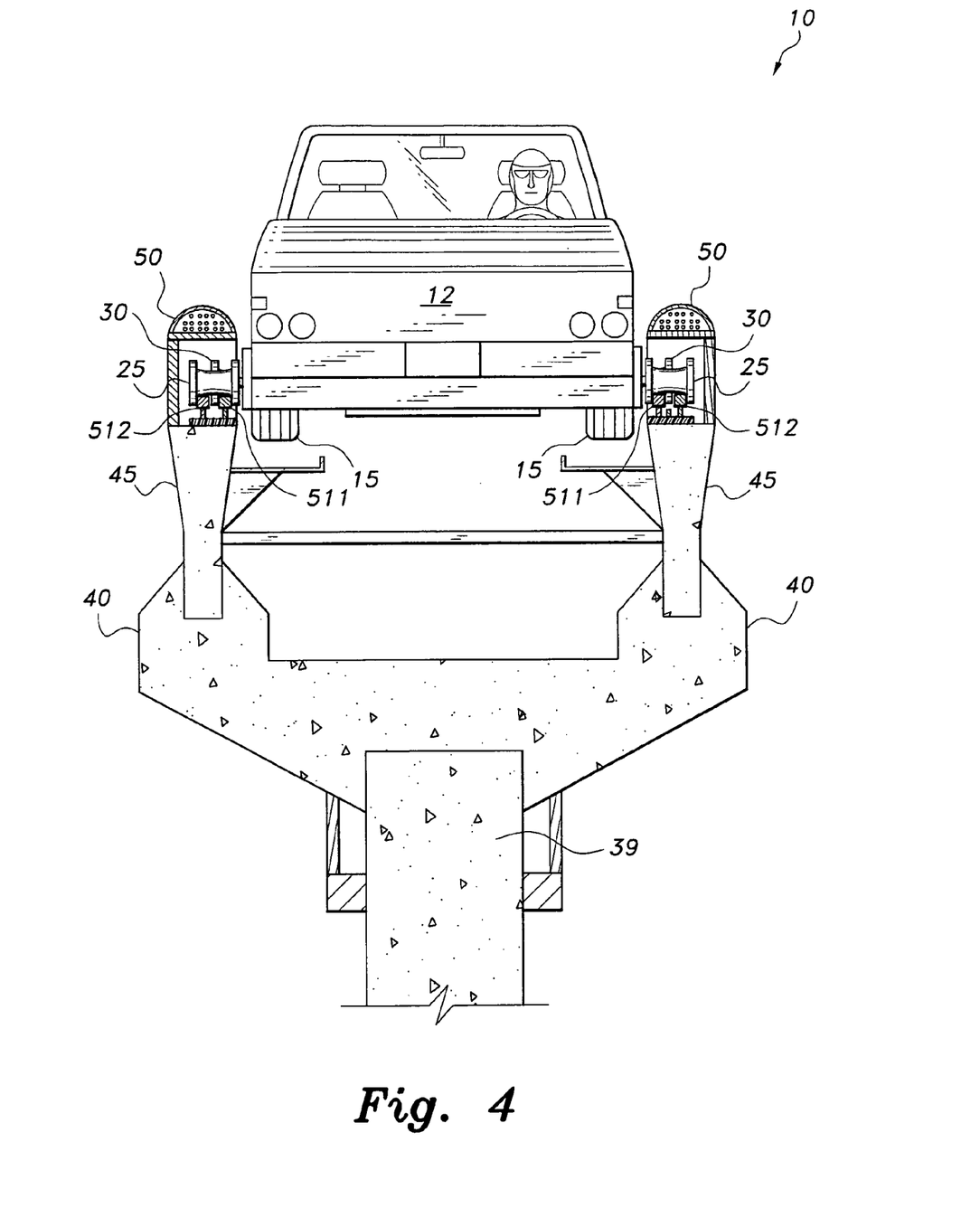
FIG. 4 is a front view, partially in section, of the rail support and vehicle of the public highway system according to the present invention.

Referring now to FIGS. 4 and 8 it is shown that the vehicles 12 travel on steel wheels 25 and 30, riding steel rails 511 or 512, the rails being supported by prefabricated, steel reinforced concrete support structures 40 and 45 attached to vertical support beam 39, which extends from the ground over right-of-way of system 10. It is next to impossible to fall off the guideway unless the aforementioned support structures 39, 40 and 45 fail. To ensure that vehicle 12 does not accidentally fall away from the support system, a pair of wheel supports 800 may be attached to and laterally extend away from the vertical guideway supports 45.

The vehicles 12 can still have large conventional gasoline engines, or may be all-electric or hybrids of the two propulsion systems for the off-guideway street mode. Accessories of vehicle 12 may include, but not be limited to television, telephones, food support, workstations, and the like, since the vehicles are automatically driven on the guideway of system 10, leaving the occupants to engage in activities other than watching the road. System power cables, control cables, and the like may be disposed under protective cap 50.

Preferably, the system 10 supplies electric power to the vehicles 12 through electrified rails and/or high-speed pantographs or shoes extending from the vehicles 12.

Guideway construction is of a preformed, pre-cast, pre-stressed/post stressed steel reinforced guideway support base 40. Vertical guideway supports 45 extend from guideway support base 40 and house the rails 511 and 512. The support post, stanchion 39 is also steel reinforced and extends from the ground, supporting guideway support base 40 at top of the stanchion 39. The support base 40 may be adjustably pivotal with respect to stanchion 39 to allow maintenance and construction crews to fine tune a tilt angle of the guideway for perfect alignment of guideway sections.

Specially designed guideway construction trains can be designed for laying down the guideway tracks and their supporting structures. These trains may have a self-propelled railroad type crane at the front end followed by a type of flatbed for receiving pre-fabricated stanchions or beams and rails from the central constructing site. A construction site or sites will be selected along a planned guideway corridor, determined primarily by land availability, environmental and pollution assessments. A relatively short guideway of twenty miles or less may only require a single construction site. Inter-city, interstate guideways may require several such temporary sites.

The stanchions and beams for the guideway are fabricated, molded/preformed at the site. The site is the starting point and supply center for a portion of the guideway. The elevated track can be extended from a site in any direction. The concept of laying down the track/guideway ahead of the train relies heavily on railroad construction technology. The major differences between the two systems to be taken into account when comparing them are Weight; the bimodal vehicle weighs approximately one fortieth ($1/40$) the weight of a loaded railroad car, track gauge; the bimodal uses a much wider track gauge and rides between the tracks rather than above them, thus a much lower center of gravity (track gauge is over six feet versus four feet eight ½ inches for railroads), track support; bimodal will be almost entirely elevated with the tracks riding on concrete and steel beams whereas most railroad rails ride on wooden ties laid on rock ballast, land use; bimodal requires minimal land use using previously established rights of ways whereas railroads require wide fenced right of ways and controlled road crossings which often conflict with surface traffic, portal-to-portal; as with the automobile bimodal has the unique ability to deliver its passengers/driver direct from departure point to destination point. No other form of transportation is required.

All braking on the system 10 is energy efficient, recuperative or dynamic electric braking with mechanical backup using braking energy to generate electric power back into the power grid.

The public highway system also contemplates the use of magnetic levitation (maglev), air cushion/air bearings in place of steel wheels on rails and using linear induction motors (LIM) rather than rotary electric motors. Also, a variety of wheel-rail configurations are contemplated by the public highway system. Moreover, the system would also allow for transportation of freight and mail and mass transit in fully automated terminal-to-terminal driverless captive vehicles.

It is to be understood that the present invention is not limited to the embodiment described above, but encompasses any and all embodiments within the scope of the following claims.

I claim:

1. A public highway system, comprising:
    a narrow-gauge pair of rails and a wide-gauge pair of rails, the rails forming a guideway that begins on a roadway;
    means for grading without utilizing track bed sections of the wide-gauge pair of rails and sections of the narrow-gauge pair of rails above the roadway;
    an ascending grade on-ramp portion of the guideway formed solely from the wide-gauge rail pair;
    an elevated throughway transition portion of the guideway having the wide-gauge rail pair in parallel with the narrow-gauge rail pair;
    an elevated throughway portion of the guideway having solely the narrow-gauge rail pair, the elevated throughway portion extending from the elevated throughway transition portion;
    an off-ramp portion of the guideway having a descending grade of the narrow-gauge rail pair of the throughway transition portion, the wide-gauge rail pair continuing at least at an initial height of the throughway transition portion;
    means for determining speed, acceleration, location and separation distance of vehicles utilizing said public highway system; and
    a computer in operable communication with the means for determining speed, acceleration, location and separation distance of vehicles utilizing the public highway system, the computer adjusting speed of the vehicles and separation distance of the vehicles on the highway system responsive to the information from the means for determining speed, acceleration, location and separation distance of vehicles;
    wherein a vehicle adapted for manually controlled travel on the roadway and automatically controlled travel on the guideway can transition from the roadway to automatically controlled travel on the guideway and can transition from the guideway to manually controlled travel on the roadway.

2. The public highway system according to claim 1, wherein the public highway system is bimodal, the bimodal system transporting freight, mail, and mass transit in a fully automated terminal-to-terminal driverless mode utilizing captive vehicles having exclusive on and off ramps leading to federal, commercial, industrial, and public terminals.

3. The public highway system according to claim 1, wherein said means for determining speed, acceleration, location and separation distance of vehicles utilizing said public highway system comprises:
    means for passively coding information for display in said guideway;
    means for disseminating the information displayed in said guideway to the vehicles; and
    means for maintaining separation distances of vehicles utilizing GPS, radar, laser, and other distance measuring technologies.

4. The public highway system according to claim 1, further comprising:
    a plurality of vertical guideway supports, each of the vertical guideway supports holding one side of said pairs of rails;
    a vertical support beam elevating a portion of the public highway system; and
    a tiltable, bilateral support structure extending from the vertical support beam, the tiltable bilateral support structure holding the vertical guideway supports proximate each lateral end of the bilateral support structure.

5. The public highway system according to claim 4, further comprising wheel supports extending laterally inward from the guideway supports below the rails, the wheel supports catching a derailed vehicle.

6. The public highway system according to claim 4, further comprising a protective cap extending inward from a top lateral portion of said vertical guideway supports, the protective cap deflecting strong cross winds from the moving vehicles and providing weather shielding for system power cables and control cables.

7. The public highway system according to claim 1, wherein said means for determining speed, acceleration, location and separation distance of said vehicles comprises location information displayed on intervals of said guideway.

8. The public highway system according to claim 1, further comprising teeth disposed in a high gradient section of rails, the teeth allowing accessory wheel teeth on the vehicle to engage the high gradient section for greater traction, the high gradient guideway being a third rail system which blends seamlessly with a standard guideway directing vehicles to split off the main line into multiple off ramps, reducing speed commensurate with the third rail high gradient multiple systems permitting non-stop traffic flow over mountainous terrain.

9. The public highway system according to claim 1, further comprising a vertically stacked parking structure adapted for receiving vehicles having wheel and drive assemblies required for travel over the public highway system.

10. A motor vehicle, comprising:
   means for travel on a conventional roadway;
   a stationary, narrow-gauge set of wheels engaging a portion of a variable gauge rail guideway;
   a variable-gauge set of wheels selectively engaging narrow-gauge and wide-gauge portions of the variable-gauge rail guideway;
   a scanner adapted for receiving location and target speed information from said variable-gauge rail roadway;
   an onboard computer accepting the location information received by the scanner; and
   onboard speed, navigation and diagnostic controllers in operable communication with the onboard computer;
   wherein the onboard computer, in combination with the controllers, adjusts a speed of the vehicle and sets a configuration of the variable-gauge set of wheels engaging the variable-gauge rail guideway.

11. The motor vehicle, according to claim 10, further comprising a public highway system having:
   a narrow-gauge pair of rails and a wide-gauge pair of rails, the rails forming a guideway beginning on a roadway;
   means for grading without utilizing track bed sections of the wide-gauge pair of rails and sections of the narrow-gauge pair of rails above the roadway;
   an ascending grade on-ramp portion of the guideway formed solely from the wide-gauge rail pair;
   an elevated throughway transition portion of the guideway having the wide-gauge rail pair in parallel with the narrow-gauge rail pair;
   an elevated throughway portion of the guideway having solely the narrow-gauge rail pair, the elevated throughway portion extending from the elevated throughway transition portion;
   an off-ramp portion of the guideway having a descending grade of the narrow-gauge rail pair of the throughway transition portion, the wide-gauge rail pair continuing at least at an initial height of the throughway transition portion; and
   means for determining speed, acceleration, location and separation distance of vehicles utilizing the public highway system;
   wherein said motor vehicle manually travels on the roadway and automatically travels on the guideway, transitioning from the roadway to automatically controlled travel on the guideway and transitioning from the guideway to manually controlled travel on the roadway based on an itinerary set by the navigation controller.

12. The motor vehicle according to claim 11, wherein the guideway has a plurality of passive coded bar graphs encoded with location information and vehicle speed directives, and for informing vehicles when they are in locations permitting wide wheel adjustments.

13. The motor vehicle according to claim 10, wherein the scanner reads passive bar graphs encoded with location information and vehicle speed directives and transition information.

14. The motor vehicle according to claim 10, wherein the diagnostic controller includes means for determining whether a vehicle and associated systems are healthy enough to proceed on said guideway.

15. The motor vehicle according to claim 14, further comprising means for commanding said vehicle to proceed onto said guideway or alternatively proceed to the nearest off-ramp based on said vehicle health determination.

16. The motor vehicle according to claim 10, further comprising means for limiting speed of said vehicle based on determination of track and vehicle wheel conditions while said vehicle is traveling on said guideway.

17. The motor vehicle, according to claim 10, wherein a nominal speed of said motor vehicle on said guideway is approximately 120 MPH.

18. The motor vehicle according to claim 10, further comprising means for automatically stopping said vehicle and all other vehicles traveling proximate said vehicle simultaneously and then directing said vehicles to the next off-ramp at slow speed.

19. The motor vehicle according to claim 11, wherein said throughway portion of said guideway has up to a three percent grade.

20. The motor vehicle according to claim 11, further comprising means for accepting electrical power from the guideway for operation of said vehicle and electronic subsystems of said vehicle.

\* \* \* \* \*